(12) United States Patent
Morell

(10) Patent No.: US 6,729,646 B1
(45) Date of Patent: May 4, 2004

(54) METHOD AND SYSTEM FOR CONTROLLING A VEHICLE OCCUPANT SAFETY SYSTEM BASED ON CRASH SEVERITY

(75) Inventor: Scott Morell, White Lake Twp., MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/257,123

(22) Filed: Feb. 25, 1999

(51) Int. Cl.[7] .............................................. B60R 21/32
(52) U.S. Cl. ........................................ 280/735; 701/45
(58) Field of Search ............................ 280/735; 701/45

(56) References Cited

U.S. PATENT DOCUMENTS

| | | | |
|---|---|---|---|
| 5,232,243 A | | 8/1993 | Blackburn et al. |
| 5,413,378 A | | 5/1995 | Steffens |
| 5,436,838 A | * | 7/1995 | Miyamori ............... 364/424.05 |
| 5,519,613 A | * | 5/1996 | Gioutsos et al. ....... 364/424.05 |
| 5,626,359 A | | 5/1997 | Steffens |
| 5,702,124 A | * | 12/1997 | Foo et al. .................... 280/735 |
| 5,722,686 A | * | 3/1998 | Blackburn et al. .......... 280/735 |
| 5,746,444 A | * | 5/1998 | Foo et al. .................... 280/735 |
| 5,777,225 A | * | 7/1998 | Sada et al. ..................... 73/488 |
| 5,809,439 A | * | 9/1998 | Damisch ....................... 701/45 |
| 5,868,423 A | * | 2/1999 | Takimoto et al. ........... 280/735 |
| 5,899,948 A | * | 5/1999 | Raphael et al. ............... 701/45 |
| 5,904,368 A | * | 5/1999 | Blackburn et al. .......... 280/735 |
| 5,904,730 A | * | 5/1999 | Yamazaki et al. ........... 701/301 |
| 5,906,393 A | | 5/1999 | Mazur |
| 5,935,182 A | * | 8/1999 | Foo et al. ..................... 701/45 |
| 5,967,548 A | * | 10/1999 | Kozyreff ..................... 280/735 |
| 5,969,599 A | * | 10/1999 | Wessels et al. ............. 340/436 |
| 5,978,722 A | * | 11/1999 | Takasuka et al. ............. 701/45 |
| 6,000,717 A | | 12/1999 | Rayford |
| 6,005,479 A | * | 12/1999 | Ide ............................. 340/438 |
| 6,012,008 A | * | 1/2000 | Scully .......................... 701/45 |
| 6,015,163 A | | 1/2000 | Langford |
| 6,018,693 A | * | 1/2000 | Blackburn et al. ............ 701/45 |
| 6,036,225 A | * | 3/2000 | Foo et al. .................... 280/735 |
| 6,061,616 A | * | 5/2000 | Ohno et al. ................... 701/45 |
| 6,070,115 A | | 5/2000 | Oestreicher |

FOREIGN PATENT DOCUMENTS

WO        WO 98/17508        4/1998

\* cited by examiner

Primary Examiner—Lesley D. Morris
Assistant Examiner—L. Lum

(57) ABSTRACT

A method and system for controlling a vehicle occupant safety system based on crash severity. The system uses an acceleration signal indicating the acceleration of the vehicle upon occurrence of a crash to determine whether to trigger a restraint device. A controller implements a crash sensing algorithm to determine whether the severity of the crash warrants deployment of the safety restraint. The algorithm uses a predicted velocity and an acceleration peak time derived from the acceleration signal. The predicted velocity is indicative of the relative velocity between the passenger and the vehicle at a predetermined time following detection of a crash event. The acceleration peak time is the time period between peak acceleration values that correspond to contacting of significant structural elements of the vehicle, such as the bumper and the radiator. The two values are compared to their respective thresholds and if both of them exceed their thresholds then a deployment signal is generated to trigger the safety restraint.

17 Claims, 3 Drawing Sheets

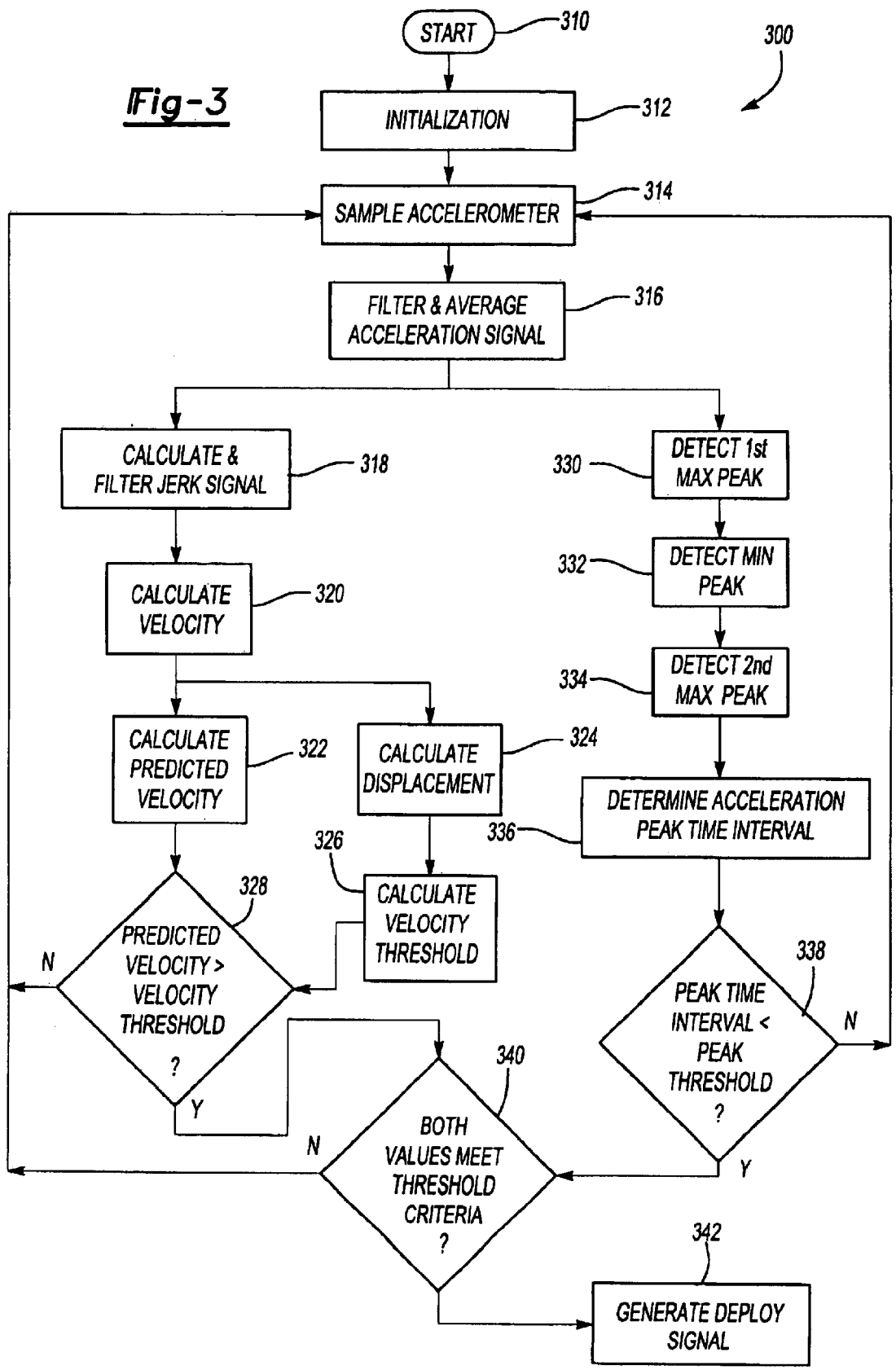

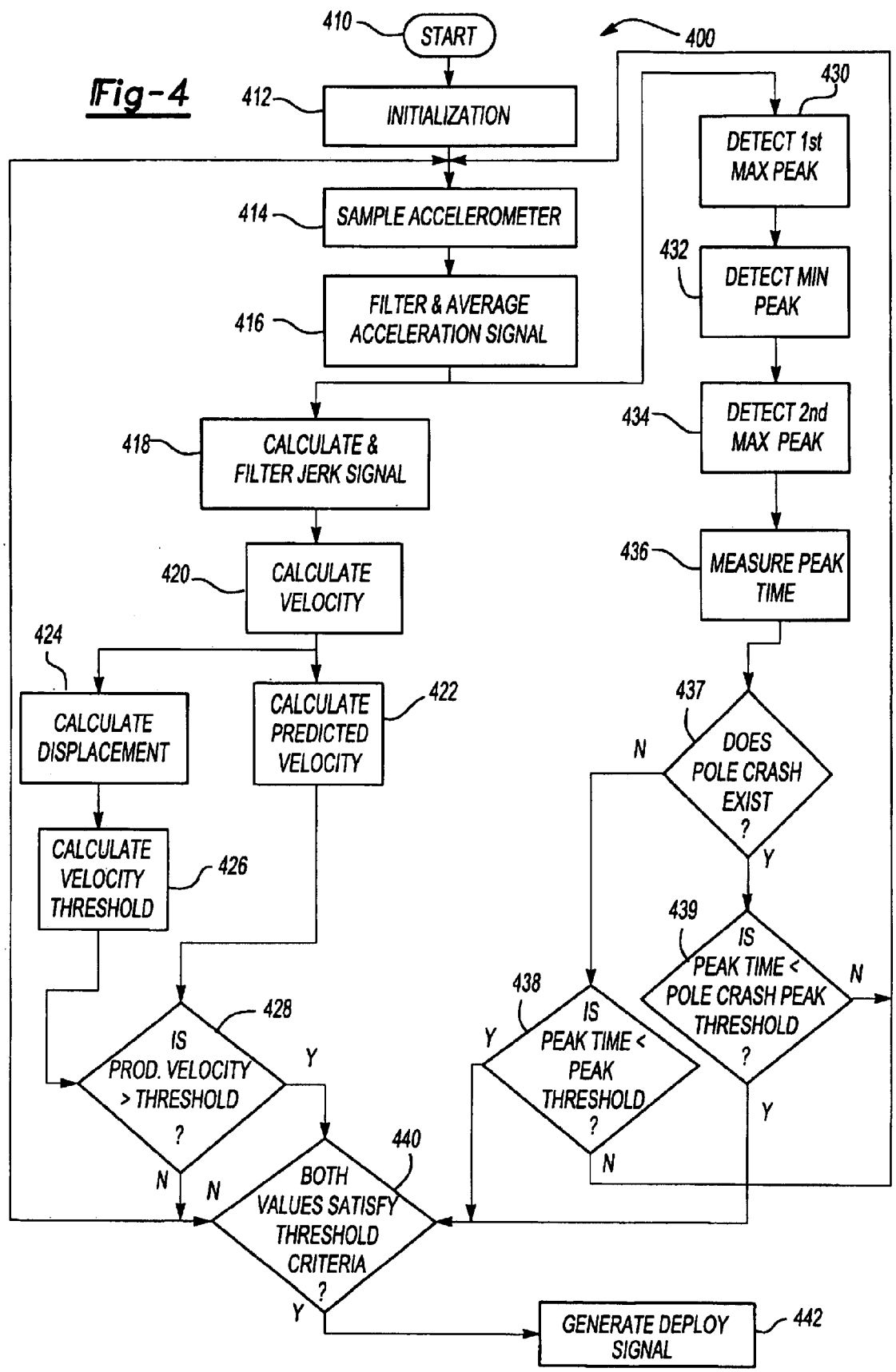

METHOD AND SYSTEM FOR CONTROLLING A VEHICLE OCCUPANT SAFETY SYSTEM BASED ON CRASH SEVERITY

BACKGROUND OF THE INVENTION

1. Field of the Invention

The present invention relates to a vehicle occupant safety system and more particularly to a method and system for determining the severity of a vehicle crash and controlling an occupant safety system in response to the crash severity.

2. Related Art

It is known in the art relating to vehicle safety systems to trigger a passenger safety restraint in response to a vehicle crash. Such systems typically include an accelerometer mounted on the vehicle to sense vehicle acceleration crash condition. A controller is operatively connected to the accelerometer to receive an acceleration signal. The controller analyzes the acceleration signal to determine the severity of the crash and then based on the analysis the controller activates the safety restraint as required. The controller may determine the severity of the crash by using various calculated values of velocity, crash displacement and energy.

Such vehicle safety systems often include an air bag that inflates and cushions a passenger in the event of a crash. It is particularly desirable for the air bag to be activated only when the crash conditions require such activation. Unnecessary activation of the air bag may startle and distract the driver and may require costly replacement work to be done. Thus, it is desirable to provide a system that can accurately discriminate between fire and non-fire events.

SUMMARY OF THE INVENTION

The present invention provides a method and system for controlling a vehicle safety system based upon crash severity.

In one embodiment, the method and system determines a predicted velocity from a sensed vehicle acceleration signal, compares the predicted velocity with a velocity threshold and activates the safety restraint, for example, an air bag, if the predicted velocity exceeds the velocity threshold.

The predicted velocity is the velocity of the passenger relative to the vehicle at a time equal to the present time plus the airbag inflation time. A high predicted velocity generally indicates a severe crash condition.

In another embodiment, the method and system determines a predicted velocity from a sensed vehicle acceleration signal, and compares the predicted velocity with a velocity threshold. The method and system also determines an acceleration peak time from the sensed acceleration signal, and compares the acceleration peak time with an acceleration peak time threshold and activates the safety restraint if the predicted velocity exceeds the velocity threshold and the acceleration peak time is less than the acceleration peak time threshold.

The acceleration peak time is the time period measured from the detection of a first predetermined maximum acceleration value, to a predetermined minimum acceleration value and to a second predetermined maximum acceleration value. The detection of maximum acceleration times indicates the contacting of the bumper and then the contacting of the radiator support area of the vehicle as the vehicle structure collapses. With a higher speed crash, the contacts occur closer in time than for a lower speed crash. By determining the time interval between the contacts, the present invention better discriminates between high and low severity crashes.

In another embodiment, the method and system determine a predicted velocity from a vehicle acceleration signal, and compares the predicted velocity with a velocity threshold. The method and system also determines an acceleration peak time from the vehicle acceleration signal, and compares the acceleration peak time with an acceleration peak time threshold. The method and system also determines from the sensed acceleration signal whether a pole crash event has occurred and activates the safety restraint if the predicted velocity exceeds the velocity threshold and the acceleration peak time exceeds the acceleration peak time threshold, and the acceleration signal indicates that a pole crash event has occurred.

These and other features and advantages of the invention will be more fully understood from the following detailed description of the invention taken together with the accompanying drawings.

BRIEF DESCRIPTION OF THE DRAWINGS

In the drawings:

FIG. 3 is a flowchart of the operation of a vehicle occupant safety system in accordance with another embodiment of the present invention; and FIG. 4 is a flowchart of the operation of a vehicle occupant safety system in accordance with another embodiment of the present invention.

DETAILED DESCRIPTION OF THE INVENTION

Figure 1:
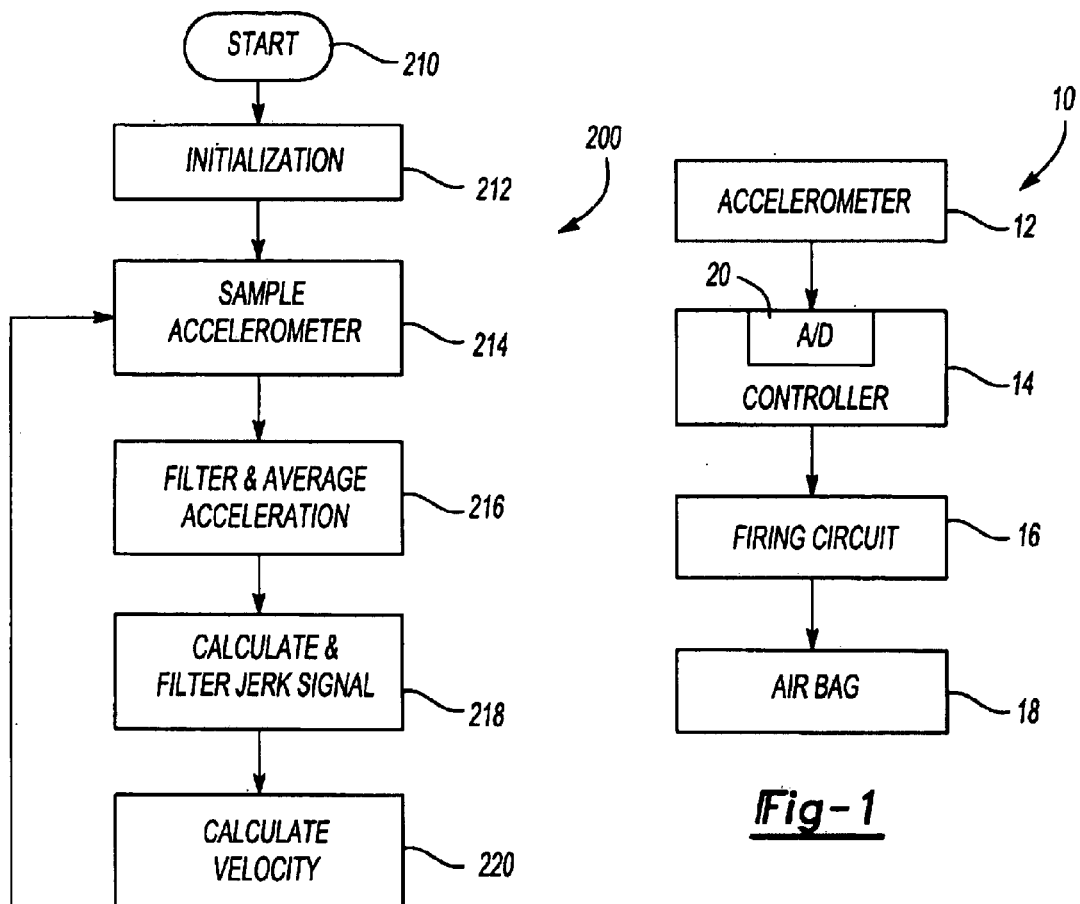
FIG. 1 is a block diagram of a vehicle occupant safety system having an air bag in accordance with the present invention.

Referring to FIG. 1 of the drawings, numeral 10 generally indicates a vehicle occupant safety restraint system including sensor 12, such as an accelerometer, controller 14, firing circuit 16 and safety restraint 18, such as an air bag. Accelerometer 12 is mounted on the vehicle frame (not shown) to provide an analog signal corresponding to the acceleration, positive or negative, along the longitudinal axis of the vehicle caused by a crash. The acceleration signal is applied to an input of analog-to-digital (AND) converter 20 of controller 14 to convert the signal from analog to digital. Controller 14 analyzes the acceleration signal by using a crash-sensing algorithm to determine whether air bag 18 should be deployed. If air bag 18 is to be deployed, controller 14 generates a deployment signal, which is applied to firing circuit 16. Upon receipt of the deployment signal, firing circuit 16 causes the deployment of air bag 18.

Controller 14 may be a conventional microcontroller, which includes such elements as a central processing unit (CPU), read only memory (ROM) devices, random access memory (RAM) devices, input/output circuitry (I/O) and the A/D converter. When activated, controller 18 carries out a series of operations stored in an instruction-by-instruction format in ROM for providing deployment control of safety restraints within safety restraint system 10. One such operation is the analysis of the acceleration signal to determine whether a crash exists warranting deployment of an air bag.

In the present invention, controller 18 derives a predicted velocity from the sensed acceleration signal and uses the predicted velocity to determine the crash severity. The predicted velocity is the velocity of the passenger relative to the vehicle at a time equal to the present time plus the airbag inflation time. A high predicted velocity generally indicates a severe crash condition. The predicted velocity is compared to a velocity threshold that is also derived from the sensed acceleration. If the predicted velocity exceeds the velocity threshold, controller 14 generates a deployment signal to trigger the deployment of air bag 18.

Figure 2:
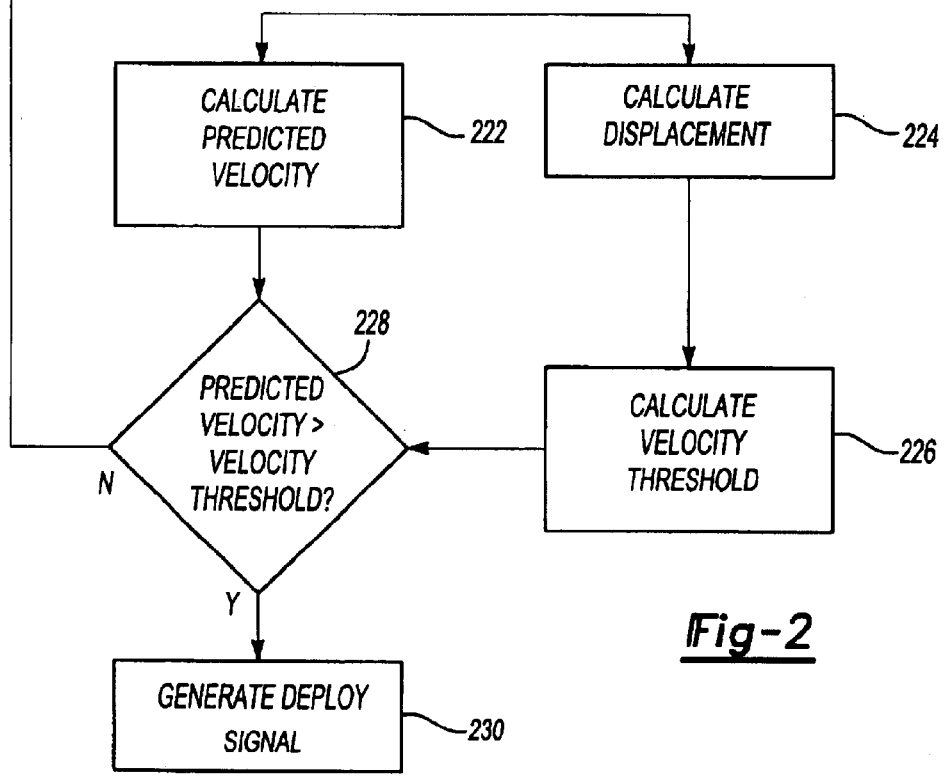
FIG. 2 is a flowchart of the operation of a vehicle occupant safety system in accordance with an embodiment of the present invention.

As shown in FIG. 2, operation 200 is initiated at step 210 upon application of power to controller 14 and proceeds from step 210 to carry out general initialization operations at step 212. Such initialization operations include setting pointers, flags, registers and RAM variables to their starting values. Following the general initialization operations, controller 14 samples the acceleration signal and converts the analog signal to a digital signal at step 214. The rate of conversions is selected in accordance with known sampling criteria to assure reliable representation of the analog acceleration signal is obtained. At step 216, the acceleration signal is averaged and filtered.

To determine the predicted velocity, steps 218–222 are executed. At step 218, a filtered jerk signal is determined by taking the derivative of the acceleration signal to form a raw jerk signal and then filtering the raw jerk signal. The derivative is found by sending the acceleration signal to a ring buffer having a 0.004-second buffer length, taking the difference between the first and last values and then scaling the value by 1/0.004. At step 220, the acceleration signal is integrated and stored in a RAM location as a velocity signal.

The predicted velocity is determined at a future time which account for the time required to inflate air bag 18 once a deployment signal is issued. This is done by estimating the predicted velocity in accordance with the velocity signal, filtered jerk signal, acceleration signal and the airbag inflation time. The predicted velocity is determined by integrating an acceleration signal having the assumed form y=at+b. The solution to the equation implemented by the controller at step 212 is as follows:

$$\int y\, dt = [0.5aT^2 + bT + c]$$

{evaluated from time t to t+T} where:

∫y dt=predicted velocity;

a=filtered jerk signal;

b=filtered acceleration signal;

c=velocity signal; and

T=inflation time of the air bag.

Next, the predicted displacement of the vehicle occupant is determined similarly to the predicted velocity of the vehicle occupant at step 224. The predicted displacement of the occupant is determined at a future time which accounts for the time required to inflate air bag 18 once a deployment signal is issued. This is done by estimating the predicted displacement in accordance with the displacement signal, velocity signal, acceleration signal and the required deployment time. The above equation is used to determine the predicted displacement value except "a" equals acceleration, "b" equals velocity and "c" equals displacement.

The velocity threshold, which is compared to the predicted velocity to determine the severity of the crash, is determined at step 226. The velocity threshold is determined by combining a predetermined velocity reference value and a displacement factor. The displacement factor is proportional to an amount the predicted displacement exceeded a predetermined displacement threshold.

Next, at step 228, the predicted velocity is compared to the velocity threshold to determine whether the predicted velocity is greater than the velocity threshold. This is done by subtracting the predicted velocity from the velocity threshold. Then, the resulting difference is multiplied by a weighting factor, which limits the predicted velocity between zero and one. By determining the predicted velocity in this manner, the operation will not proceed to the next step unless the predicted velocity exceeds the velocity threshold. If the predicted velocity exceeds the velocity threshold, controller 14 generates a deployment signal in step 230. Otherwise, controller 14 returns to step 214 and performs another cycle of sampling the acceleration signal and determining whether a severe crash event has occurred.

It may be desirable to rely on factors other than the predicted velocity when determining the severity of a crash event. In that regard, another useful factor is the time between acceleration peaks. The detection of an acceleration peak may indicate contacting of significant structural elements of a vehicle. During the course of a crash event, the maximum acceleration peaks typically indicate, among other events, the contacting of the bumper and the contacting of the radiator support area as the vehicle structure collapses. With a higher speed crash, the contacts occur closer in time than for a lower speed crash. By determining the time interval between the acceleration peak points, the present invention better discriminates between high and low severity crashes.

In an alternative embodiment, controller 14 determines the severity of the crash using predicted velocity and acceleration peak time derived from the sensed acceleration signal. The steps for determining crash severity using predicted velocity and acceleration peak time is shown in FIG. 3. Steps 310–328 correspond to steps 210–228 of FIG. 2, respectively, and relate to determining predicted velocity and the velocity threshold, and comparing the predicted velocity to the velocity threshold.

Steps 330–338 relate to determining an acceleration peak time, which corresponds to the time period between acceleration peaks indicative of the contacting of significant structural elements of the vehicle. In step 330, a first maximum acceleration peak is detected by accumulating the acceleration data points until the data point is greater than a predetermined maximum, and that data point is stored in a RAM location as the first maximum acceleration peak value. At step 332, the acceleration points are accumulated until a data point is less than a predetermined minimum value, and that data point is stored in a RAM location as the minimum acceleration peak value. Next, at step 334, a second maximum acceleration peak that exceeds a second predetermined maximum is detected. Finally at step 336, the time between the first and second maximum acceleration peaks is measured to form the acceleration peak time.

At step 338, the acceleration peak time is compared to a predetermined acceleration peak time threshold. The predetermined acceleration peak time threshold may vary for different vehicle models and is set as necessary. If the acceleration peak time is less than the predetermined acceleration peak time threshold, controller 14 continues to step 340. Otherwise, controller 14 returns to step 314 to sample the accelerometer. Likewise, if the predicted velocity exceeds the velocity threshold as indicated in step 328, controller 14 continues to step 340, otherwise controller 14 returns to step 314. If the predicted velocity exceeds its threshold and the acceleration peak time is less than its threshold, as indicated in step 340, controller 14 generates a deployment signal in step 342.

Another factor that may be considered in determining crash severity is whether the crash is a pole crash event. In a pole crash event, the crash severity may be greater than the predicted velocity or acceleration peak time may indicate. During a pole crash, the acceleration signal tends to be moderate until the pole contacts the engine and then the acceleration signal increases rapidly. It is desirable to recognize the pole crash event well in advance of the engine contact because the air bag deployment delay time must be considered to ensure full deployment of the air bag when the rapid acceleration increase occurs.

In another embodiment, the present invention determines the presence of a pole crash event and deploys air bag 18 accordingly. The steps for determining crash severity that recognizes the presence of a pole crash event, is shown in FIG. 4. In FIG. 4, steps 410–428 correspond to steps 310–328, respectively, and relate to determining whether the predicted velocity exceeds the velocity threshold. Likewise, steps 430–436 correspond to steps 330–336, and relate to determining the acceleration peak time. The determination of whether a pole crash exists is made at step 437. A pole crash condition is determined to exist if the following requirements are met: the minimum acceleration peak is very small, near zero or another predetermined level; the difference between the first maximum peak and the minimum acceleration peak is very large; and the second maximum acceleration peak is greater than the first maximum acceleration peak.

If a pole crash condition exists, the acceleration peak time between the first and second acceleration peak times is determined and compared to a predetermined pole crash time threshold. Controller 14 performs the comparison by subtracting the acceleration peak time from the pole crash time threshold at step 439. However, if a pole crash does not exist, the acceleration peak time is compared to the predetermined acceleration peak time threshold by subtracting the acceleration peak time from the predetermined acceleration peak time threshold at step 438. Then, the resulting difference is multiplied by a weighting factor limiting the acceleration peak time value to between zero and one.

Finally, if the predicted velocity exceeds the velocity threshold and the acceleration peak time is less than the peak time threshold, a deployment signal is generated to trigger the air bag. At step 440, the predicted velocity is added to the acceleration peak time value. The sum can only be greater than one when the predicted velocity exceeds the velocity threshold, and the acceleration peak time is less than the acceleration peak time threshold or the pole acceleration peak time is less than the pole crash peak threshold. When the sum is greater than one, controller 14 generates the deployment signal at step 442. Otherwise, controller 14 returns to step 414.

Although the invention has been described by reference to a specific embodiment, it should be understood that numerous changes may be made within the spirit and scope of the inventive concepts described. For example, different weighting factors may be used for the differences of the various values in order to adjust the performance of the safety system. Accordingly, it is intended that the invention not be limited to the described embodiment, but that it have the full scope defined by the language of the following claims.

What is claimed is:

1. A method of controlling a vehicle occupant safety restraint system including an airbag, said method comprising the steps of;

generating an acceleration signal indicative of vehicle acceleration;

determining a jerk signal from a slope of the acceleration signal;

determining a velocity signal by integrating the acceleration signal;

determining a predicted velocity indicative of a relative velocity between a passenger and the vehicle at a time equal to a present time plus an airbag inflation time in accordance with the velocity signal, the jerk signal, the acceleration signal and a deploy time period required to deploy the safety restraint system;

subtracting the predicted velocity from a velocity threshold to obtain a difference value and applying a weighting factor to the difference value to limit the predicted velocity to values between zero and one; and generating a deployment signal to activate the occupant safety restraint system when the predicted velocity exceed the velocity threshold.

2. The method as in claim 1, further comprising the step of calculating the velocity threshold by determining a predicted displacement of the vehicle occupant, comparing the predicted displacement to a predetermined displacement threshold value, and adding to a predetermined velocity reference value a factor proportional to an amount that the predicted displacement exceeded the displacement threshold value.

3. The method as in claim 2, wherein said step of determining the predicted displacement of the vehicle occupant includes the steps of:

determining a velocity signal by integrating the acceleration signal;

determining a displacement signal by integrating the velocity signal; and determining the predicted displacement value based upon the displacement signal, velocity signal, acceleration signal and a deploy time period required to deploy the safety restraint system.

4. A method of controlling a vehicle occupant safety restraint system including an airbag, said method comprising the steps of;

generating an acceleration signal indicative of vehicle acceleration;

determining a jerk signal from a slope of the acceleration signal, determining a velocity signal by integrating the acceleration signal;

determining a predicted velocity in accordance with the velocity signal, the jerk signal, the acceleration signal and a deploy time period required to deploy the safety restraint system;

determining an acceleration peak time indicative of a time interval between a first maximum acceleration level and a second maximum acceleration level;

comparing the predicted velocity to a velocity threshold to obtain a difference value;

applying a weighting factor to the difference value to limit the predicted velocity to values with a predetermined range; and comparing the acceleration peak time to a predetermined acceleration time threshold; and generating a deployment signal to activate the occupant safety restraint system when the predicted velocity exceeds the velocity threshold and the acceleration peak time is less than the acceleration time threshold.

5. The method as in claim 4, wherein said comparing step comprises subtracting the predicted velocity from the velocity threshold to find a difference value; and multiplying the difference value by a weighting factor to limit the predicted velocity to values between zero and one.

6. The method as in claim 5, wherein said comparing step comprises calculating the velocity threshold by determining a predicted displacement value of the vehicle occupant, comparing the predicted displacement value to a predetermined displacement threshold value, and adding to a predetermined velocity reference value a factor proportional to an amount that the predicted displacement value exceeded the displacement threshold value.

7. The method as in claim 6, wherein said step of determining the predicted displacement of the vehicle occupant includes the steps of:

determining a velocity by integrating the acceleration signal;

determining a displacement by integrating the velocity; and determining the predicted displacement based upon the displacement, the velocity, the acceleration signal and a deploy time period required to deploy the safety restraint system.

8. The method as in claim 7, further comprising the steps of: detecting a pole crash condition by determining a minimum acceleration peak value;

determining whether a difference between the first maximum acceleration peak value and the minimum acceleration peak value is less than a predetermined difference; and determining whether the second acceleration maximum peak value is greater than the first acceleration maximum peak value; and generating a deployment signal if a pole crash condition is detected.

9. The method as in claim 4, wherein said step of comparing is further defined by subtracting the predicted velocity from the velocity threshold to find the difference value; and multiplying the difference value by the weighting factor to limit the predicted velocity to values between zero and one.

10. A system for controlling a vehicle safety restraint system, comprising:

a sensor for sensing vehicle acceleration and generating an acceleration signal in response;

an occupant safety restraint device; and a controller operatively connected to said sensor and said occupant safety restraint device, said controller adapted to calculate a predicted velocity indicative of the relative velocity between a passenger and the vehicle at a predetermined time following a crash event from said acceleration signal, and an acceleration peak time value, compare the predicted velocity to a velocity threshold, and the acceleration peak time value with a predetermined acceleration value; and generate a deployment signal to activate said occupant safety restraint device when said predicted velocity exceeds said velocity threshold and said acceleration peak time value is less than said predetermined acceleration peak time threshold.

11. The system as in claim 10, wherein said controller is adapted to calculate the predicted velocity by determining a jerk signal from a slope of said acceleration signal, determining a velocity signal by integrating said acceleration signal, and developing said predicted velocity in accordance with said velocity signal, said jerk signal, said acceleration signal and a deploy time period required to deploy said occupant safety restraint device.

12. The system as in claim 11, wherein said controller is adapted to calculate said acceleration peak time value by detecting a first acceleration maximum peak value, detecting an acceleration minimum peak value when said acceleration signal decreases below said first acceleration maximum peak value by a predetermined value, and detecting a second acceleration maximum peak value.

13. The system as in claim 12, wherein said controller is adapted to compare said predicted velocity to said velocity threshold by calculating said velocity threshold, subtracting said predicted velocity from said velocity threshold to find a difference value, and multiplying said difference value by a weighting factor to limit said predicted velocity to values between zero and one.

14. The system as in claim 13, wherein said controller is adapted to calculate said velocity threshold by determining a predicted displacement of the vehicle occupant, comparing said predicted displacement to a predetermined displacement threshold value, and adding to a predetermined velocity reference value a factor equal to an amount that said predicted displacement exceeds said displacement threshold value.

15. The system as in claim 14, wherein said controller is adapted to determine said predicted displacement of the vehicle occupant by determining a velocity signal by integrating said acceleration signal, determining a displacement signal by integrating said velocity signal, and developing said predicted displacement value based upon said displacement signal, velocity signal, acceleration signal and a deploy time period required to deploy said occupant safety restraint device.

16. The system as in claim 15, wherein said controller detects whether a pole crash condition exists and generates said deployment signal if said pole crash condition is detected.

17. The system as in claim 16, wherein said controller detects a pole crash condition if a detected minimum acceleration peak value is less than a predetermined minimum value, a difference between said first maximum acceleration peak value and said minimum acceleration peak value exceeds a predetermined difference, and said second acceleration maximum peak value exceeds said first acceleration maximum peak value.

* * * * *